United States Patent
Mikiya et al.

(10) Patent No.: US 7,537,246 B2
(45) Date of Patent: May 26, 2009

(54) PIPE COUPLER

(75) Inventors: Toshio Mikiya, Tokyo (JP); Koji Matsumoto, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 538 days.

(21) Appl. No.: 10/808,067

(22) Filed: Mar. 24, 2004

(65) Prior Publication Data

US 2004/0189005 A1    Sep. 30, 2004

(30) Foreign Application Priority Data

Mar. 25, 2003    (JP)    ............................. 2003-082911

(51) Int. Cl.
    *F16L 27/00*    (2006.01)
(52) U.S. Cl. ..................... 285/276; 285/39; 251/149.6
(58) Field of Classification Search ............... 285/39, 285/317, 81–86, 316, 276, 277; 251/149.6
    See application file for complete search history.

(56) References Cited

U.S. PATENT DOCUMENTS

| | | | |
|---|---|---|---|
| 4,074,698 A * | 2/1978 | Hobson et al. | 137/614.06 |
| 4,919,174 A | 4/1990 | Warland | |
| 5,095,947 A | 3/1992 | Weh et al. | |
| 5,607,139 A * | 3/1997 | Kjellberg | 251/149.6 |
| 5,998,697 A * | 12/1999 | Devlin | 800/20 |

FOREIGN PATENT DOCUMENTS

| | | |
|---|---|---|
| CA | 1141798 | 2/1983 |
| CA | 2435311 | 9/2004 |
| DE | DD 208 404 B1 | 5/1984 |
| JP | 8-1357 Y2 | 1/1996 |
| JP | 2001-41381 A | 2/2001 |

OTHER PUBLICATIONS

German Office Action issued Sep. 10, 2008 in German patent application No. 10 2004 014 461.3-24 (with translation).

* cited by examiner

*Primary Examiner*—Aaron M Dunwoody
(74) *Attorney, Agent, or Firm*—Brinks Hofer Gilson & Lione

(57) ABSTRACT

A female coupler suitable for use with a high pressure fluid is provided. The female coupler has locking members or balls adapted to be forced into engagement with a male coupler inserted into the female coupler by a sleeve or outer movable member. The sleeve is held by holding members or balls until the male coupler is inserted into the female coupler and a locking ball receiving recess formed in the exterior surface thereof is brought into a position for receiving the locking balls therein. Accordingly, the sleeve is prevented from moving to a position for forcing the locking ball into the locking ball receiving recess even if the male coupler is suddenly moved out from the female coupler, which is a problem that can occur in prior art female couplers. Further, the sleeve is provided with handle. An operator can grip the handle to hold the female coupler and align it with the male coupler, and advance the former towards the latter so that male coupler is inserted into the female coupler and, then, the sleeve is moved to the locking position.

5 Claims, 7 Drawing Sheets ved and put to practical use. To supply such vehicles, it# PIPE COUPLER

This application claims foreign priority under 35 U.S.C. § 119 to Japanese patent application No. 2002-082911 filed Mar. 25, 2003, the entire content of which is hereby incorporated by reference.

BACKGROUND OF THE INVENTION

The present invention relates to a pipe coupling consisting of male and female couplers or couplings, and, in particular, to a female coupler.

In recent years, hydrogen-powered vehicles have been developed and put to practical use. To supply such vehicles, it is necessary to provide liquid hydrogen in tanks at gas stations or the like. To transfer liquid hydrogen from a supply tank at a gas station of the like to a vehicle tank, a female coupler fluidly connected to the hydrogen supply tank is joined to a male coupler fluidly connected to the vehicle tank.

The liquid hydrogen is stored under high pressure, for example, at a pressure of around 30 Mpa or more. Thus, a female coupler to be used in transferring liquid hydrogen under such high pressures must have a sufficiently strong construction. In providing a female coupler which has a sufficiently strong construction, however, the coupler inevitably becomes both bulky and heavy, which makes it difficult to be used by either a driver, or by an attendant at a gas station.

Further, the conventional type of female coupler is designed such that when a male coupler has been adequately inserted into a tubular body of the female coupler, a sleeve slidably mounted on the tubular body is moved to a locking position under the action of a spring which radially inwardly forces locking balls provided in the tubular body into an annular groove of the male coupler, to thereby securely hold the male coupler within the female coupler. However, there is a danger with this construction that the male coupler may suddenly become disengaged and move out from the female coupler before the annular groove reaches a position for receiving the locking balls. While sudden movement of the male coupler may cause the sleeve to be moved by the spring to the locking position, if the male coupler is slowly pulled out, an inner movable member or locking ball support member provided in the tubular body, which has been moved rearwards against a second spring by the male coupler, will be returned under the action of the second spring, and will support the locking balls to prevent the sleeve from moving to the locking position. A female coupler which is subject to a high pressure fluid such as liquefied hydrogen is desirably designed to associate the sleeve with a valve provided in the female coupler such that only when the sleeve is located at a locking position, which means a male coupler has been connected to the female coupler by means of the locking balls, the valve is allowed to be opened. It is therefore desirable for such a female coupler to be able to prevent the sleeve from accidentally moving to the locking position in a situation that the male coupler suddenly becomes disengaged and moves out from the female coupler before the annular groove of the male coupler reaches a position for receiving the locking balls.

SUMMARY OF THE INVENTION

Accordingly, an object of the present invention is to provide a female coupler suitable for use in transfer of a high pressure fluid such as liquefied hydrogen.

According to the present invention, there is provided a female coupler adapted to be connected to a male coupler comprising:

a coupler body having a cylindrical male coupler receiving portion for receiving a male coupler therein, and a fluid passage to be fluidly communicated with a fluid passage of the male coupler which has been received in the male coupler receiving portion, the cylindrical male coupler receiving portion having a radial hole radially extending therethrough;

a locking member disposed in the radial hole and movable between, an engagement position wherein the locking member engages with a locking member receiving recess formed on the outer surface of the male coupler, and which has been inserted into the cylindrical male coupler receiving portion to thereby prevent the male coupler from being disengaged or from moving out from the male coupler receiving portion, and a disengagement position wherein the locking member is positioned radially outwardly relative to the engagement position, and disengages from the locking member receiving recess of the male coupler to thereby allow the male coupler to move out from the male coupler receiving portion;

an outer movable member mounted on the cylindrical male coupler receiving portion, the outer movable member being axially movable between, a locking position wherein the outer movable member urges the locking member to the engagement position, and an unlocking position wherein the outer movable member allows the locking member to move to the disengagement position; and, a securing member for engaging with and securing the outer movable member to the unlocking position, the securing member being disengaged from the outer movable member to allow the outer movable member to move to the locking position when the locking member receiving recess has been moved to an axial position for receiving the locking member.

Provision of the securing member in the female coupler makes it possible to prevent the outer movable member, which corresponds to the sleeve mentioned in connection with the prior arts, from moving to the locking position even if a male coupler is suddenly disengaged and moves out from the female coupler before the locking member receiving recess reaches an axial position for receiving the locking members.

Specifically, the female coupler of the present invention may further comprise:

an inner movable member disposed in the cylindrical male coupler receiving portion, the inner movable member being axially movable between, an advanced position wherein the inner movable member engages with the locking member to hold the locking member in the disengagement position, and a retracted position for allowing the locking member to move to the engagement position; and, a first urging member for urging the inner movable member towards the advanced position;

the inner movable member urging the securing member radially outwards to ensure that the securing member is securely engaged with the outer movable member at the unlocking position;

the inner movable member being moved from the advanced position to the retracted position by the male coupler inserted into the male coupler receiving portion and, when the male coupler has been moved to a position wherein the locking member receiving recess is located at an axial position for receiving the locking member, thus allowing the securing member to disengage from the outer movable member.

In this female coupler, the inner movable member functions both as a locking member support and as a securing member support.

Alternatively, the female coupler of the present invention may comprise an inner movable member disposed in the cylindrical male coupler receiving portion, the inner movable member being axially movable between,

- a retracted position wherein the inner movable member, which having been moved rearwards by the male coupler is moved to a position wherein the locking member receiving recess thereof is located at an axial position for receiving the locking member therein; and,
- an advanced position that is closer to the locking member than in the retracted position;
- a first urging member for urging the inner movable member towards the advanced position;
- the inner movable member urging the securing member radially outwards to ensure that the securing member securely engages with the outer movable member at the unlocking position, and allowing the outer movable member to move to the locking position when the inner movable member is moved to the retracted position by the male coupler.

In the female coupler of the present invention, the inner movable member need not have any association with the locking member.

The female coupler of the present invention may further comprise a second urging member for urging the outer movable member from the unlocking position towards the locking position. The second urging member enables the sleeve to automatically move to the locking position when the male coupler has been adequately inserted into the female coupler for engagement therewith.

In accordance with another aspect of the present invention, there is provided a female coupler comprising:

- a coupler body having a cylindrical male coupler receiving portion adapted to receive a male coupler therein, and a fluid passage to be fluidly communicated with a fluid passage of the male coupler which has been received in the male coupler receiving portion, the cylindrical male coupler receiving portion having a radial hole;
- a locking member disposed in the radial hole and movable between,
- an engagement position wherein the locking member engages with a locking member receiving recess formed on the outer surface of the male coupler which has been inserted into the cylindrical male coupler receiving portion, to thereby prevent the male coupler from being disengaged or moving out from the male coupler receiving portion, and
- a disengagement position wherein the locking member is positioned radially outwardly relative to the engagement position and disengages from the locking member receiving recess of the male coupler to thereby allow the male coupler to move out from the male coupler receiving portion;
- an outer movable member mounted on the cylindrical male coupler receiving portion, the outer movable member being axially movable between,
- a locking position wherein the outer movable member urges the locking member to the engagement position, and
- an unlocking position wherein the outer movable member allows the locking member to move to the disengagement position;
- a handle fixedly connected to the outer movable member, and which is gripped by an operator to hold the female coupler when for coupling the female coupler with the male coupler; and,
- a holding member for engaging with and holding the outer movable member in the unlocking position, the holding member being disengaged from the outer movable member to allow the outer movable member to move to the locking position when the male coupler has been inserted into the male coupler receiving portion and has reached a position at which the locking member receiving recess is located at an axial position for receiving the locking member;
- the cylindrical male coupler receiving portion engaging with and preventing the male coupler from advancing further once the male coupler has been inserted into the male coupler receiving portion, with advancement of the female coupler towards the male coupler, and has reached a position wherein the locking member receiving recess is located at an axial position for receiving the locking member.

The provision of the handle makes it easy for an operator to manipulate the female coupler in coupling the female coupler to the male coupler, even if the female coupler is heavy and/or bulky.

The female coupler may comprise:

- an inner movable member disposed in the cylindrical male coupler receiving portion, the inner movable member being axially movable between,
- an advanced position wherein the inner movable member engages with the locking member to hold the locking member in the disengagement position, and
- a retracted position for allowing the locking member to move to the engagement position; and,
- a first urging member for urging the inner movable member towards the advanced position;
- the locking member functioning as the holding member in such a manner that the locking member holds the outer movable member at the unlocking position when the locking member is located at the disengagement position, and which allows the outer movable member to move to the locking position when the locking member is located at the engagement position.

The outer movable member can be formed to be cylindrical and to be coaxial with the cylindrical male coupler receiving portion, and has an interior surface that slidably engages with an exterior surface of the male coupler at its receiving portion, the interior surface having a locking portion for urging the locking member to the engagement position when the outer movable member is located at the locking position, and a recess for receiving the locking member when the outer movable member is located at the unlocking position.

Alternatively, the female coupler of the present invention may comprise:

- an inner movable member disposed in the cylindrical male coupler receiving portion, the inner movable member being axially movable between,
- a retracted position wherein the inner movable member has been moved rearwards by the male coupler which has been moved to a position wherein the locking member receiving recess thereof is located at an axial position for receiving the locking member therein; and,
- an advanced position which is closer to the locking member than the retracted position;

a first urging member for urging the inner movable member towards the advanced position;

the inner movable member urging the securing member radially outwards to bring the securing member into secure engagement with the outer movable member at the unlocking position, and allowing the outer movable member to move to the locking position when the inner movable member has been moved to the retracted position by the male coupler.

Further, the female coupler of the present invention may comprise a second urging member for urging the outer movable member from the unlocking position towards the locking position.

Specifically, the handle may comprise a pair of grip members which are separated from each other in a transverse direction of the female coupler, which are positioned at the rearward end of the female coupler, and which are connected to opposite lateral sides of the outer movable member.

BRIEF DESCRIPTION OF THE DRAWING

These and other features, aspects, and advantages of the present invention will become apparent with reference to the following description, claims and accompanying drawing, where.

DETAILED DESCRIPTION OF THE INVENTION

Figure 1:
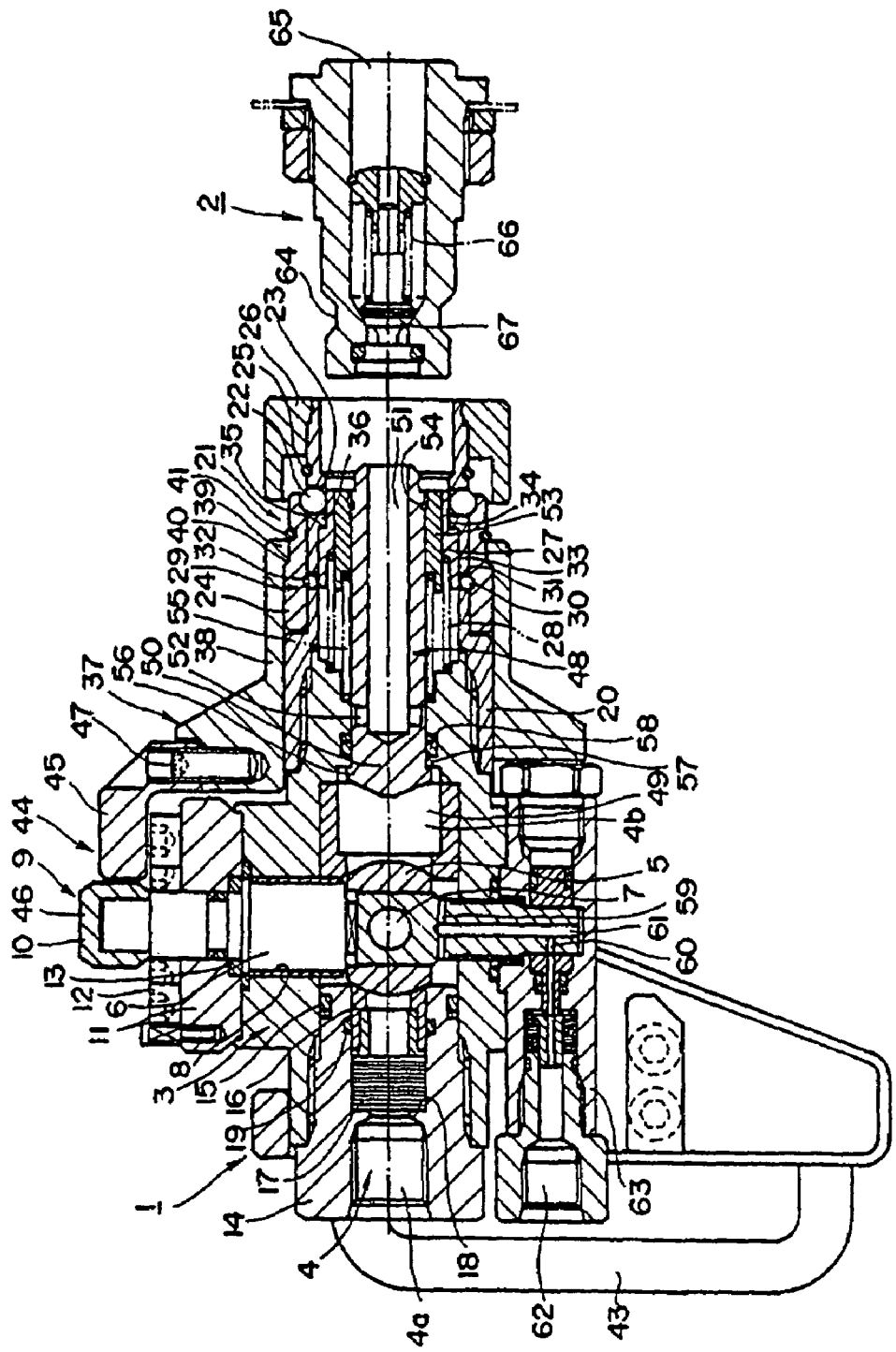
FIG. 1 is a longitudinal sectional side-elevation view of a pipe coupling comprising a female coupler in accordance with a first embodiment of the present invention.

With reference to FIGS. 1-6, there is shown a pipe coupling which comprises a female coupler 1 in accordance with an embodiment of the present invention and a male coupler 2 to which the female coupler 1 is connected. Typically, the female coupler is installed in a liquefied hydrogen supply system at a gas-station and the male coupler is mounted on a hydrogen-powered vehicle for a liquefied hydrogen car tank.

The male coupler 2 includes a tubular coupler body having an internal bore 65 extending therethrough, and a poppet valve 67 that is biased by a spring 66 against a valve seat formed on an interior surface of the tubular coupler body defining the internal bore 65. The tubular coupler body is formed to have an annular recess 64 on an exterior surface thereof for receiving locking balls 22 of the female coupler 1, which will be explained later.

The female coupler 1 includes a tubular coupler body 3 having an internal bore 4 extending therethrough in a horizontal direction, as viewed in FIG. 1. The internal bore 4 is equipped with a ball valve 5 for closing/opening the internal bore 4, and which divides the internal bore 4 into an inlet side 4a for receiving liquefied hydrogen from a supply tank (not shown) and an outlet side 4b for sending out the liquefied hydrogen to the male coupler.

The ball valve 5 has a rotatable shaft 6 extending through the ball valve 5 and the tubular coupler body 3 in a direction normal to the internal bore 4. The rotatable shaft 6 has a square cross-sectional portion fitted into the through hole of the ball valve 5 to enable the rotatable shaft 6 to rotate the ball valve 5 upon rotation of the rotatable shaft 6. A valve bore 7 extends through the ball valve 5 and the rotational shaft 6 in a diametrical direction thereof, and may be aligned with and fluidly connect the inlet side 4a and the outlet side 4b of the internal bore 4. Between the tubular coupler body 3 and the rotatable shaft 6, there is provided a cylindrical liner 8.

A ball valve operating means 9 is provided on the female coupler 1. The ball valve operating means 9 includes a lever 10 securely connected to a top end of the rotatable shaft 6 extending outside of the tubular coupler body 3. Between the lever 10 and the tubular coupler body 3, there are provided valve shaft holding members 11, 12. A tubular fitting 14 is threadably engaged with the internal bore of the tubular coupler body 3. The tubular fitting 14 is adapted for connection of a hydrogen supply hose H (see FIG. 2) extending from a liquefied hydrogen supply tank to the female coupler 1. Reference numerals 13 and 15 denote sealing rings.

The tubular fitting 14 has a tubular sealing member 16 and a coil spring 17 provided in the through hole thereof such that the tubular sealing member 16 is axially slidably engaged with the interior surface of the tubular fitting 14; and the coil spring 17 is positioned between the tubular sealing member 16 and a stepped portion 18 formed on the interior surface of the tubular fitting 14 to urge the tubular sealing member 16 against the outer surface of the ball valve 5 for sealing-engagement with the ball valve 5. A sealing ring 19 is provided between the tubular sealing member 16 and the tubular fitting 14.

A tubular member 20 is threadably engaged with a right end portion of the tubular coupler body 3. The tubular member 20 is provided with a locking mechanism 21 for connection of the female coupler 1 with the male coupler 2.

The locking mechanism 21 includes a plurality of locking balls 22 each radially movably positioned in radial holes 23 extending through the tubular member 20 and a sleeve 24 mounted on the tubular member 20. The sleeve 24 is axially movable relative to the tubular member 20 between an advanced position (FIG. 5) wherein the sleeve 24 urges the locking balls 22 radially inwardly, and a retracted position (FIG. 1) wherein the sleeve 24 allows the locking balls 22 to move radially outwardly. On the right end portion of the tubular member 20, there are provided a stop ring 25 for preventing the sleeve 24 from disengaging from the tubular member 20, and a protective tube 26 for preventing the radial holes 23 from becoming clogged with dust or the like.

Inside the tubular member 20, there is provided an inner tubular member 27 which is axially movable between an advanced position (FIG. 1) wherein the inner tubular member prevents the locking balls 22 from moving into the internal bore of the tubular member 20, and a retracted position (FIG. 5) wherein the inner tubular member 27 allows the locking balls 22 to partly project into the internal bore of the tubular member 20. The inner tubular member 27 is urged by a coil spring 28 to the advanced position, and can be moved against the coil spring 28 by the male coupler 2 which will be inserted into the internal bore of the tubular member 20 for connection with the female coupler.

The locking mechanism 21 further has a sleeve holding mechanism 29 which ordinarily holds the sleeve 24 at the retracted position and releases the sleeve 24 to allow it to move to the advanced position when the male coupler 2 has been inserted into the female coupler 1, and when the annular groove 64 of the male coupler has been brought to an axial position where the locking balls can be received into the annular groove 64 for connection of the male coupler with the female coupler.

In the illustrated embodiment, the sleeve holding mechanism 29 includes holding balls 30 which are disposed in radial holes 31 formed in the tubular member 20 such that the holding balls 30 are radially movable between a radially outward position (FIGS. 1 and 3) wherein the holding balls 30 engage with an annular groove 32 formed on the interior surface of the sleeve 24 positioned at the retracted position, and a radially inward position (FIGS. 4 and 5) wherein the holding balls 30 disengage from the annular groove 32 to allow the sleeve 24 to be moved to the advanced position. The inner tubular member 27 has a large diameter portion 33 which engages with the holding balls 30 to position them at the radially outward position, when the inner tubular member 27 is positioned at the advanced position; and, has a small diameter portion 34 for allowing the holding balls 30 to move to the radially inward position when the inner tubular member 27 is moved to the retracted position.

The stepped portion 35 provided between the large diameter portion 33 and the small diameter portion 34 of the inner tubular member 27 is adapted to engage with an inner stepped portion 36 of the tubular member 20 (see FIG. 1), so that the inner tubular member 27 is positioned at the advanced position and is prevented from moving out from the tubular member 20.

Figure 2:
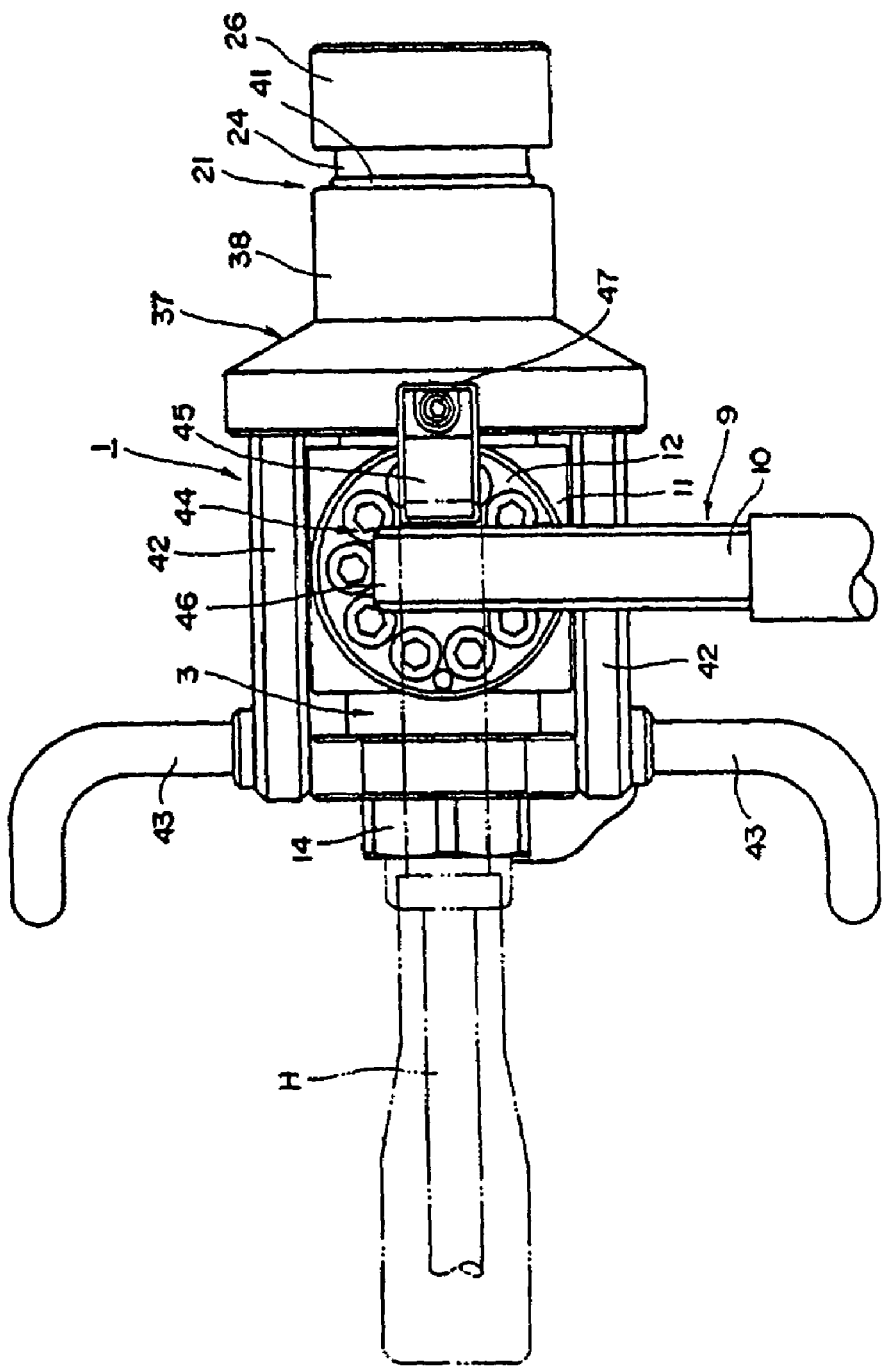
FIG. 2 is a plan view of the female coupler of FIG. 1.
Figure 3:
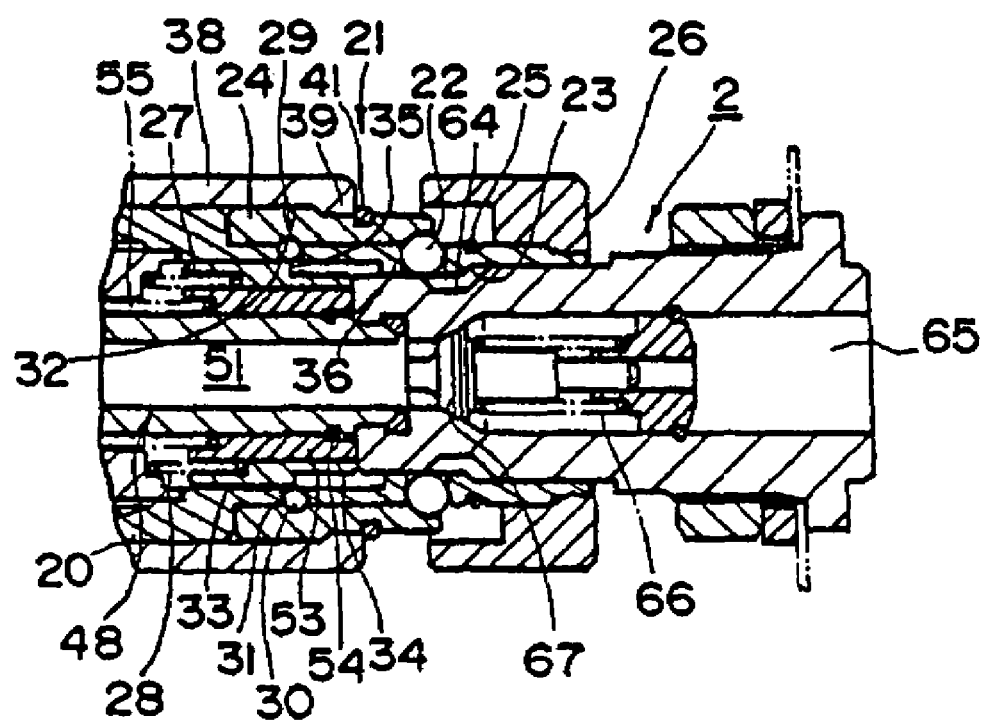
FIG. 3 is a partial longitudinal sectional view of the first embodiment showing a state in which the male coupler has been inserted into the female coupler but has not yet reached a final position for completing connection with the female coupler.
Figure 4:
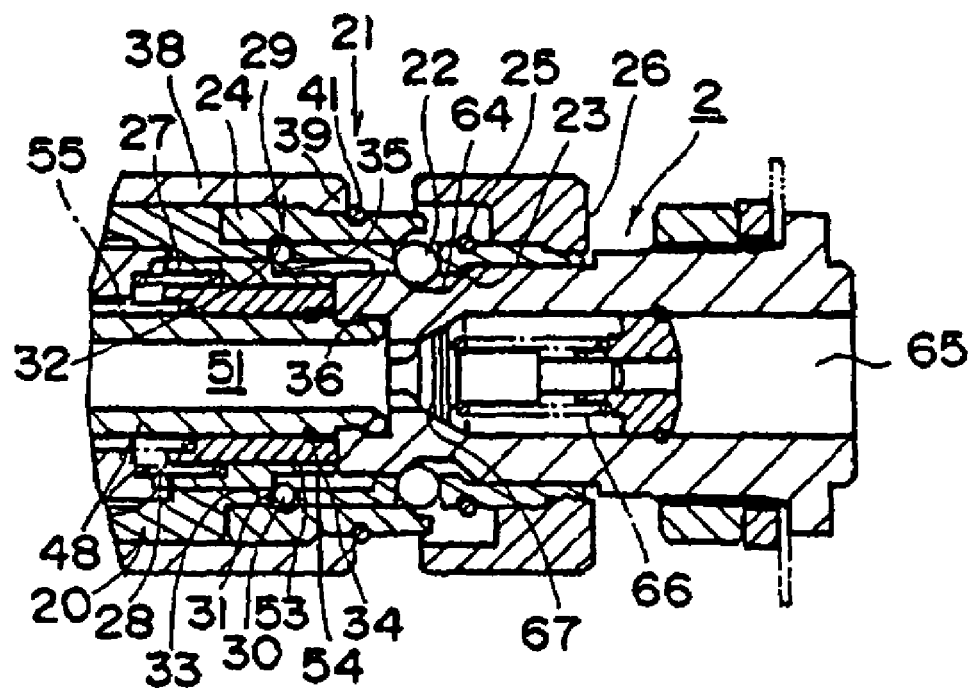
FIG. 4 is a view similar to FIG. 3 showing a state in which the male coupler has reached the final position, and the holding balls have disengaged from the sleeve or outer movable member.
Figure 5:
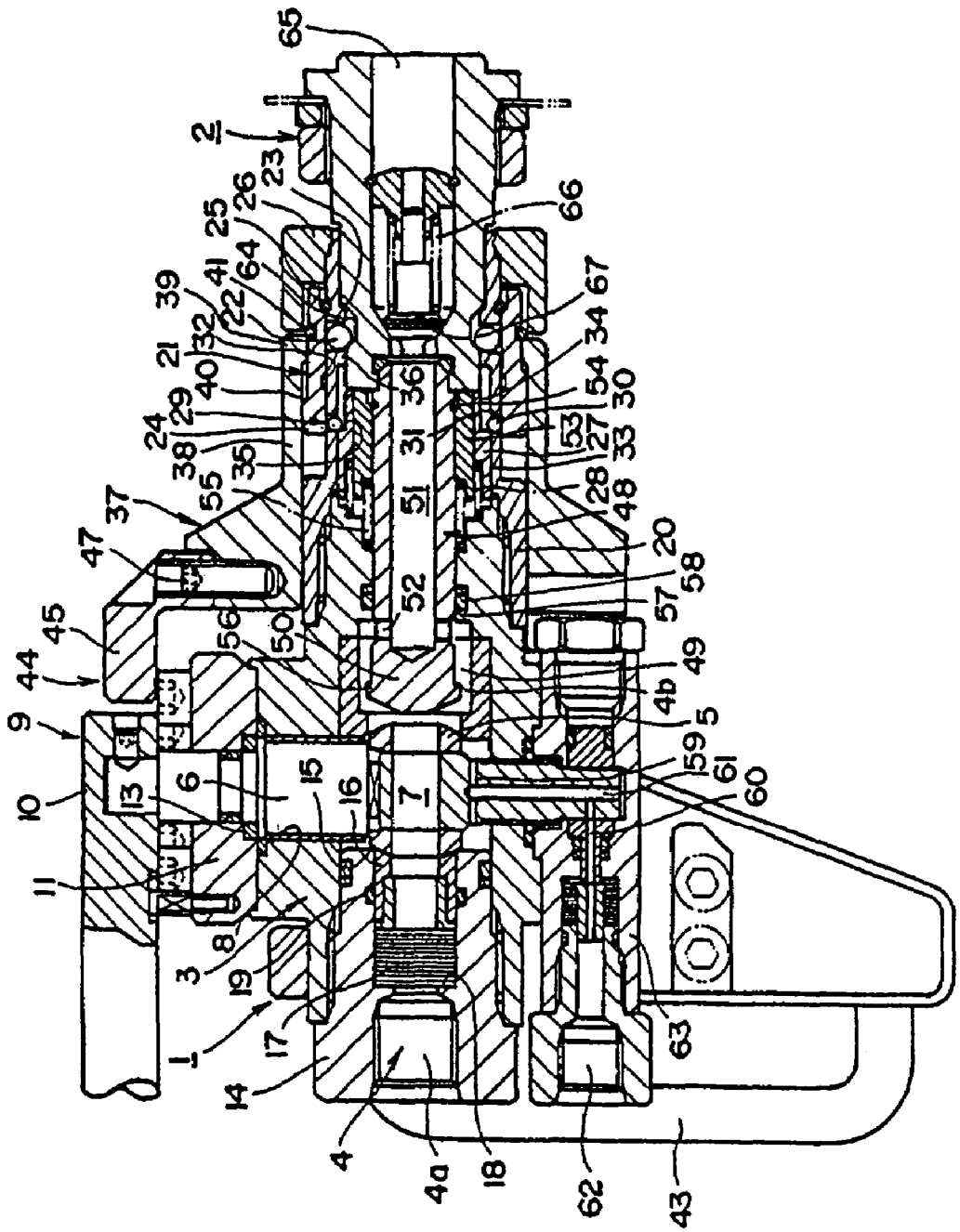
FIG. 5 is a view similar to FIG. 6 showing a state wherein the lever has been rotated whereby the ball valve is opened and the sleeve is unable to move from its locking position to prevent the male coupler from disengaging from the female coupler.

The locking mechanism 21 further includes a manual operation means 37 for manual operation of the sleeve 24. The manual operation means includes an operation tube 38 which is securely attached to the sleeve 24 at its forward end. Specifically, the operation tube 38 has a flange portion 39 at its forward end which is securely held between the stop ring 41 and a stepped portion 40 formed on the outer surface of the sleeve 24. As shown in FIG. 2, the operation tube 38 has a large diameter portion at the rear end thereof, and is provided with handle support members 42 connected to the large diameter portion and extending rewards therefrom. The handle support members 42 are provided at the rear ends thereof with handles 43. The handles 43 can have a "C"-shaped configuration, as shown in FIGS. 1 and 5 and also have a "reverse-L"-shaped configuration as shown in FIG. 2.

During operation, an operator grips the handles 43 by hand to hold the female coupler 1; then, as shown in FIG. 1, manipulates the female coupler 1 to align it with the male coupler 2, and advances the same towards the male coupler 2, or rightwards as viewed in FIG. 1. In this operation, when the annular groove 64 of the male coupler 2 has been brought into a position wherein the locking balls 22 can move into the annular groove 64, the holding balls 30 can move radially inwardly and disengage from the annular groove 32 and, substantially simultaneously, a right side surface defining the annular groove 64 is engaged by an annular step portion formed on the interior surface of the tubular member 20 to prevent further advancement of the tubular coupler body 3 towards the male coupler 2. Accordingly, if the operator further pushes the handles 43, the sleeve 24 is moved rightwards relative to the tubular member 20 of the female coupler 1 while forcing the locking balls 22 into the annular groove 64 of the male coupler 2, whereby the female coupler 1 is securely connected to the male coupler 2.

To disconnect the female coupler 1 from the male coupler 2, the operator grips and pulls the handles 43 rearwards or rightwards so that the sleeve 24 is first moved relative to the tubular member 20 from the advanced position thereof (FIG. 5) to the retracted position, wherein the sleeve 24 allows the locking balls 22 to move to the radially outward position, and engages with a large diameter portion of the tubular member 20. Accordingly, if the operator further pulls the handles 43, the sleeve 24 is moved rearwards together with the tubular member 20 (and the tubular coupler body 3 of the female coupler 1) relative to the male coupler 2, while the locking balls 22 are moved by the inner tubular member 27, which is moved forwards by the coil spring 28 relative to the tubular member 20, so as to disengage radially outwards from the annular groove 64 of the male coupler 2.

The female coupler 1 further has a valve 48 slidably engaged in the inlet side 4b of the through hole 4 of the female coupler 1 for opening/closing of the inlet side 4b. The valve 48 has an axial bore 51 extending from the forward end thereof and a radial bore 52 connected to the bottom end of the bore 52 and opening at the exterior side surface of the valve 48. The valve 48 is provided with a coaxial tubular member 53 which is slidable thereon, and which is engaged with the same by way of a stop ring 54 securely mounted on the outer surface thereof, so that the valve is urged rightwards by a coil spring 55 disposed around the valve 48 between the coaxial tubular member 53 and the tubular coupler body 3 of the female coupler 1. The valve 48 has a flange 56 at its left end portion 50 which flange is, as shown in FIG. 1, adapted to be engaged by a stepped portion 57 formed in the interior surface of the inlet side 4b of the through hole of the tubular coupler body 3 so that the valve 48 is positioned at a closing position wherein the inlet side 4b of the through hole of the tubular coupler body 3 of the female coupler is shut off by a sealing ring 58, which is provided between the interior surface of the through hole 4 of the tubular coupler body 3 and the exterior surface of the valve 48, from the radial and axial bores 52 and 51 of the valve 48. As shown in FIG. 5, the valve 48 is moved to an opening position by the male coupler 2 inserted into and connected to the female coupler 1, wherein the radial bore 52 is open to the inlet side 4b of the through hole 4 of the tubular coupler body 3 so that the radial and axial bores 51 and 53 of the valve 48 fluidly connect the inlet side 4b and the through hole 65 of the male coupler.

Further, the female coupler 1 is equipped with an operation control means 44 which permits the ball valve 5 to move to its opening position only when the female coupler 1 has been connected to the male coupler 2, the female coupler thus being permitted to be disconnected from the male coupler 2 only when the ball valve 5 has been positioned at its closing position.

Figure 6:
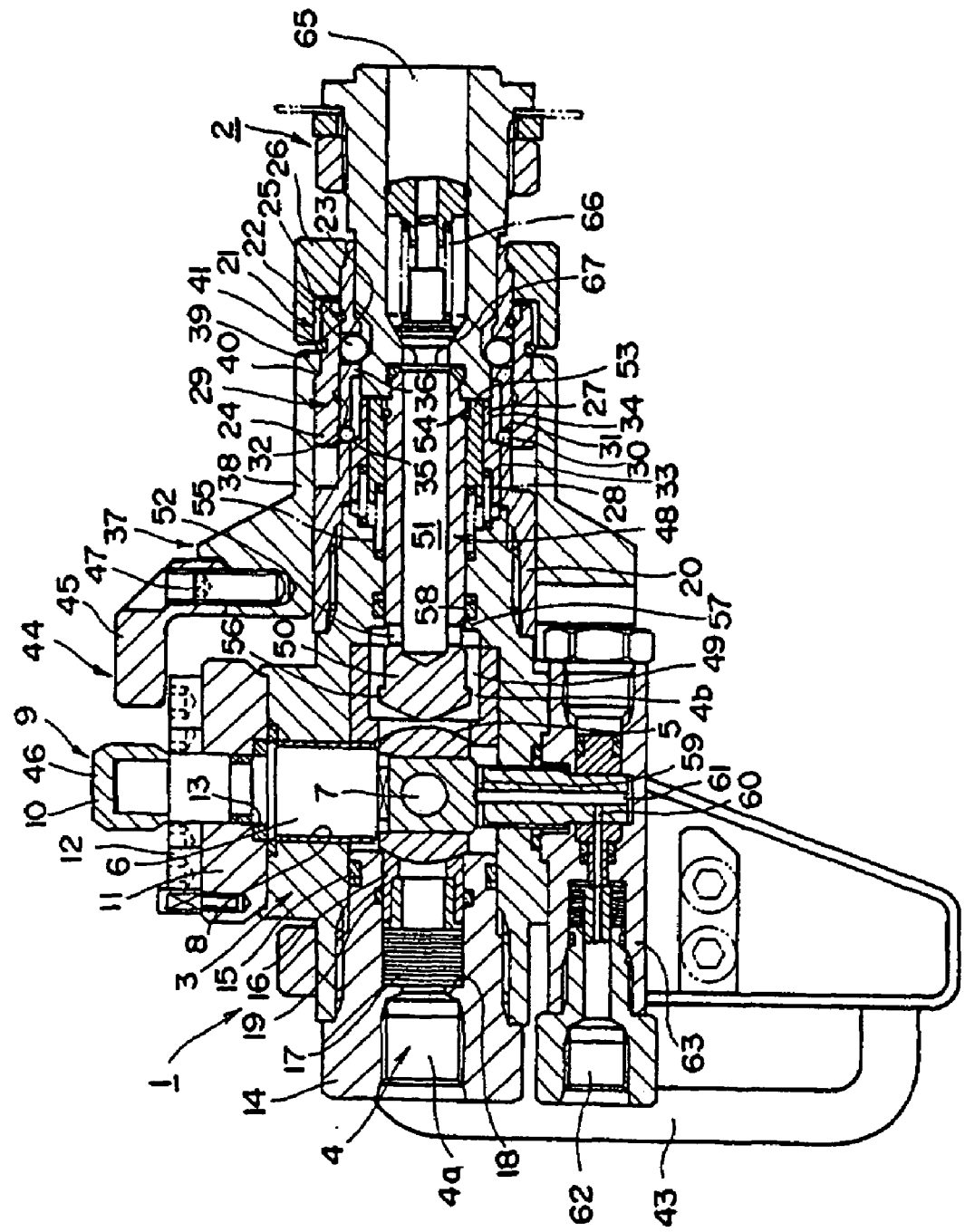
FIG. 6 is a view similar to FIG. 1 showing a state wherein the male and female couplers have been engaged each other and the sleeve has been moved to the locking position.

The operation control means 44 includes a stop member 45 fixedly attached to the large diameter portion 37 of the operation tube 37 by bolts 47 and extending rearwards; and an engaging portion 46 of the lever 10 formed at a proximal end of the lever 10 and extending in a direction opposite to that in which the distal end thereof extends. When the female coupler 1 is, as shown in FIG. 1, disengaged from the male coupler 2 and, thus, the sleeve 24 is at its rear position and the valve operation lever 10 is at the position as shown in FIGS. 1 and 2 to position the ball valve 5 at its closing position, the stop member 45 is close to the engagement portion 46 of the lever 10 so that the lever cannot be rotated from the above-stated position, whereby the ball valve 5 is kept closed. When the female coupler 1 is, as shown in FIG. 6, connected to the male coupler 2, the sleeve 24 is moved to the advanced position to hold the locking balls 22 in the annular groove 64 of the male coupler 2 and, thus, the stop member 45 is moved forwards away from the engagement portion 46 of the lever 10 so that the lever 10 is allowed to rotate to the position as shown in FIG. 5, so as to position the ball valve 5 at its opening position. When the lever 10 is held at the position shown in FIG. 5, the tip end of the engagement portion 46 is directed forwards and positioned adjacent to the stop member 45, so that the sleeve 24 cannot be moved rearwards from the advanced position shown in FIG. 5 to the retracted position shown in FIG. 6, whereby the locking balls 22 are not allowed to moved radially from the annular groove 64 of the male coupler 2 and, thus, the female coupler 1 cannot be disengaged from the male coupler 2. The female coupler is permitted to be disconnected from the male coupler 2 only when the lever 10 has been turned 90 degrees from the position shown in FIG. 5 to the position shown in FIG. 6, so that the ball valve 5 is positioned at its closing position.

When the female coupler 1 is disconnected from the male coupler 2, both of the valves 5 and 48 are positioned in their closing positions, and thus high pressure hydrogen remains in the female coupler 1. Accordingly, the female coupler 1 is provided with a pressure purge system for removing high pressure gas from the female coupler 1. The pressure purge system includes: a diametrical passage 59; an axial passage 61; and a radial passage 60. Each of these passages are formed in the lower portion of the rotatable shaft 6 and are connected to each other, and to a gas recovery passage 62 formed in a gas recovery member 63, which is securely attached to the bottom of the tubular coupler body 3 of the female coupler 1. As can be seen in FIG. 1, the pressure purge system connects the inside of the female coupler 1 to the outside of the female coupler to release the pressure remaining in the female coupler only when the ball valve 5 is in its closing position.

Figure 7:
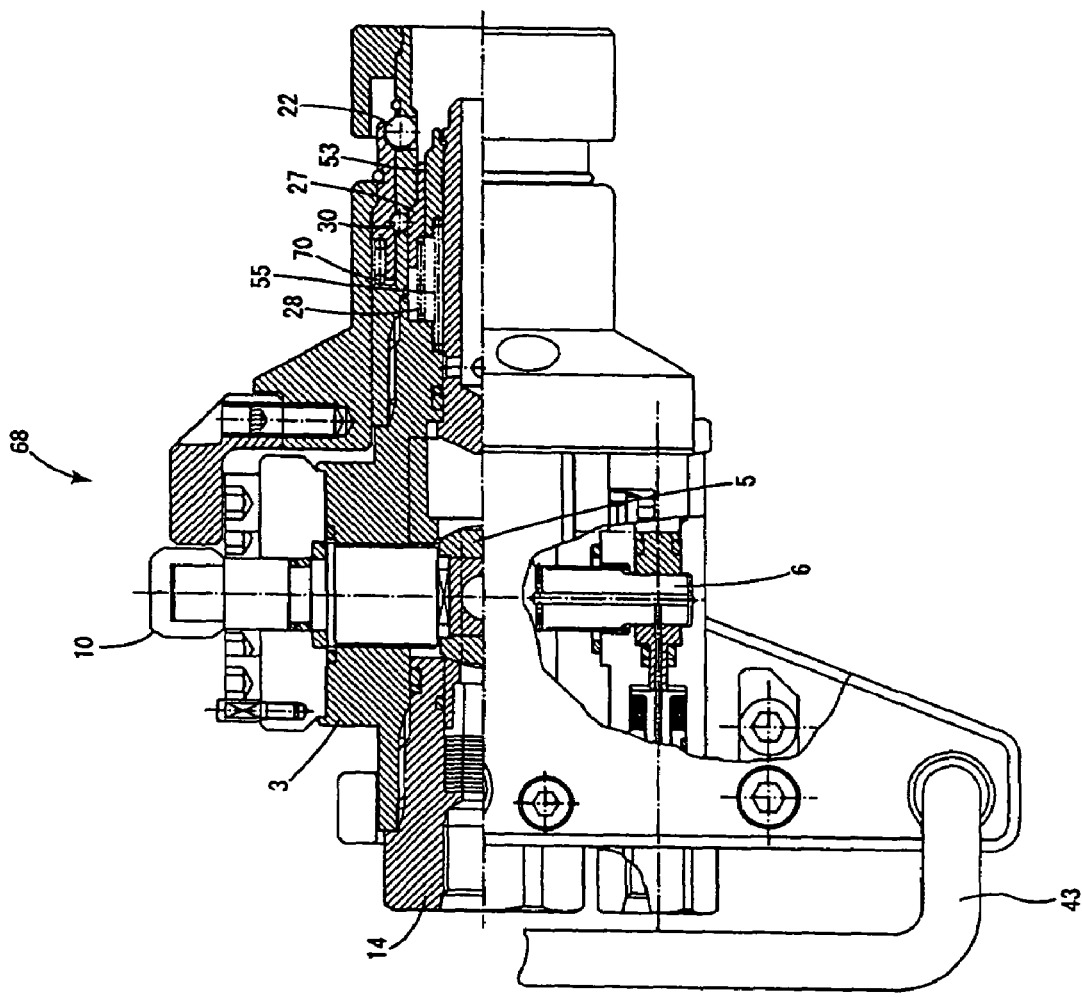
FIG. 7 is a side elevation view of a female coupler in accordance with a second embodiment of the present invention in which an upper part and a part of a lower part are cut away to show the inside of the female coupler.

FIG. 7 illustrates a female coupler 68 in accordance with another embodiment of the present invention. The female coupler 68 has a structure similar to that of the first embodiment, and like elements are denoted by like reference numerals. The female coupler 68 is different from the first embodiment in that the former includes a coil spring 70. Further, the inner tubular member 27 is shorter in its axial direction, than that of the first embodiment, to the extent that when the male coupler has not been connected to the female coupler 1 and, thus, the inner tubular member 27 is positioned at its advanced position, as shown in FIG. 7, the inner tubular member 27 does not engage with the locking balls 22, while the large diameter portion thereof engages with holding balls 30. When the inner tubular member 27 has been moved rearwards by the male coupler 2 inserted into the female coupler 1 so that the large diameter portion thereof disengages from the holding balls 30, the holding balls 30 are allowed to radially inwardly and disengage from an annular groove 32 formed in a sleeve 24, whereby the force of the coil spring 70 urges the sleeve 24 forwards so that when an annular groove 64 of the male coupler 2 has been brought to an axial position where the locking ball can be received into the annular groove 64 for connection of the male coupler with the female coupler, the sleeve 24 is moved forwards and force the locking balls 22 into the annular groove 64 of the male coupler. Preferably, the large diameter portion of the inner tubular member 27 is adapted to disengage from the holding balls 30 when the annular groove 64 of the male coupler 2 has been brought to the axial position where the locking ball can be received into the annular groove 64 of the male coupler 2.

The invention has been described in an illustrative manner, and it is to be understood that the terminology that has been used is intended for the purpose of description only, and is not to be taken in any way as being limiting.

Obviously, many modifications and variations of the present invention are possible in light of the above teachings. It is, therefore, to be understood that within the scope of the appended claims, the invention may be practiced in a manner other than that specifically set out in the foregoing description.

What is claimed is:

1. A female coupler adapted to be connected to a male coupler comprising:

a coupler body having a cylindrical male coupler receiving portion adapted to receive a male coupler therein, and a fluid passage to be fluidly communicated with a fluid passage of the male coupler which has been received in said cylindrical male coupler receiving portion, said cylindrical male coupler receiving portion having a radial hole;

a locking member disposed in said radial hole and movable between an engagement position wherein said locking member engages with a locking member receiving recess formed on the outer surface of the male coupler which has been inserted into said cylindrical male coupler receiving portion to thereby prevent the male coupler from being disengaged or moving out from said cylindrical male coupler receiving portion, and a disengagement position wherein said locking member is positioned radially outwardly relative to said engagement position and disengages from the locking member receiving recess of the male coupler to thereby allow the male coupler to move out from said cylindrical male coupler receiving portion;

an outer movable member mounted on said cylindrical male coupler receiving portion, said outer movable member being axially movable between a locking position wherein said outer movable member urges said locking member to said engagement position, and an unlocking position wherein said outer movable member allows said locking member to move to said disengagement position;

a handle fixedly connected to said outer movable member, said handle enabling an operator to hold said female coupler by grasping said handle for coupling said female coupler with the male coupler; and, a holding member for engaging with and holding said outer movable member to said unlocking position, said holding member being disengaged from said outer movable member to allow said outer movable member to move to said locking position when the male coupler has been inserted into said cylindrical male coupler receiving portion and reached a position wherein the locking member receiving recess is located at an axial position for receiving said locking member;

said cylindrical male coupler receiving portion being engaged by and prevented by the male coupler from effecting a further advancement when the male coupler has been inserted into said cylindrical male coupler receiving portion upon advancement of said female coupler towards the male coupler and reached a position wherein the locking member receiving recess is located at an axial position for receiving said locking member.

2. A female coupler as set forth in claim 1 further comprising:
- an inner movable member disposed in said cylindrical male coupler receiving portion, said inner movable member being axially movable between
  - an advanced position wherein said inner movable member engages with said locking member to hold said locking member in said disengagement position, and
  - a retracted position for allowing said locking member to move to said engagement position; and,
- a first urging member for urging said inner movable member towards said advanced position;
- said locking member functioning as said holding member in such a manner that said locking member holds said outer movable member at said unlocking position when said locking member is located at said disengagement position and allows said outer movable member to said locking position when said locking member is located at said engagement position.

3. A female coupler as set forth in claim 2 wherein:
said outer movable member is cylindrical and coaxial with said cylindrical male coupler receiving portion and has an interior surface slidably engaged with an exterior surface of said cylindrical male coupler receiving portion, said interior surface having a locking portion urging said locking member to said engagement position when said outer movable member is located at said locking position and a recess for receiving said locking member when said outer movable member is located at said unlocking position.

4. A female coupler as set forth in claim 1 further comprising:
- an inner movable member disposed in said cylindrical male coupler receiving portion, said inner movable member being axially movable between
  - a retracted position wherein said inner movable member has been moved rearwards by the male coupler which has been inserted into said cylindrical male coupler receiving portion so that said locking member receiving recess thereof has been moved to an axial position for receiving said locking member therein; and,
- an advanced position closer to said locking member than said retracted position;
- a first urging member for urging said inner movable member towards said advanced position;
- said inner movable member urging said securing member radially outwards to make the securing member engaged with and securing said outer movable member at said unlocking position, and allowing said outer movable member to move to said locking position when said inner movable member has been moved to said retracted position by the male coupler.

5. A female coupler as set forth in claim 1 wherein:
said handle comprises a pair of grip members, separated from each other in the transverse direction of the female coupler, positioned at the rearward of the female coupler and connected to opposite lateral sides of said outer movable member.

\* \* \* \* \*

UNITED STATES PATENT AND TRADEMARK OFFICE
CERTIFICATE OF CORRECTION

PATENT NO.         : 7,537,246 B2                               Page 1 of 1
APPLICATION NO.    : 10/808067
DATED              : May 26, 2009
INVENTOR(S)        : Toshio Mikiya et al.

It is certified that error appears in the above-identified patent and that said Letters Patent is hereby corrected as shown below:

On the Title Page

Item (57), after line 18 under "ABSTRACT", replace "5 Claims," with --6 Claims,--.

In the Claims

In column 12, after claim 5, line 29, insert claim 6 as follows.

--6. A female coupler as set forth in claim 4 further comprising a second urging member for urging said outer movable member from said unlocking position towards said locking position.--.

Signed and Sealed this

Twenty-fourth Day of November, 2009

David J. Kappos
*Director of the United States Patent and Trademark Office*